United States Patent [19]
Van Lerberghe

[11] Patent Number: 6,071,637
[45] Date of Patent: *Jun. 6, 2000

[54] SEALED CASING FOR CONTAINING AN ELECTRIC ACCUMULATOR

[75] Inventor: Steven Van Lerberghe, Le Mans, France

[73] Assignee: U.S. Philips Corporation, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 09/000,067

[22] PCT Filed: May 21, 1997

[86] PCT No.: PCT/IB97/00579

§ 371 Date: Jan. 22, 1998

§ 102(e) Date: Jan. 22, 1998

[87] PCT Pub. No.: WO97/44837

PCT Pub. Date: Nov. 27, 1997

[30] Foreign Application Priority Data

May 22, 1996 [FR] France ................... 96 06356

[51] Int. Cl.$^7$ .................................................. H01M 2/12
[52] U.S. Cl. ............................. 429/53; 429/54; 429/72; 429/82
[58] Field of Search ................. 429/53, 54, 55, 429/71, 72, 82

[56] References Cited

U.S. PATENT DOCUMENTS 5,326,652  7/1994  Lalke ...................................... 429/127

FOREIGN PATENT DOCUMENTS 63285862A  3/1989  Japan .

*Primary Examiner*—Stephen Kalafut
*Assistant Examiner*—Monique Wills
*Attorney, Agent, or Firm*—Dicran Halajian

[57] ABSTRACT

A sealed casing is provided for withstanding a certain pressure. The casing contains an electric accumulator, and is formed by at least one wall which has at least one closing area formed by a plastic band for connecting two edges of the wall. The closing area includes an adhesive part and a shiftable part to form an effective and economical closure.

21 Claims, 3 Drawing Sheets

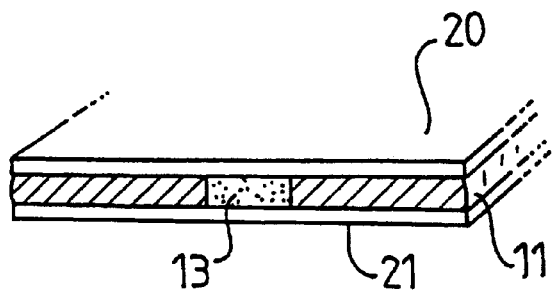
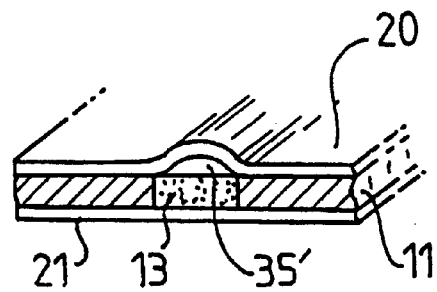
FIG. 8A   FIG. 8B
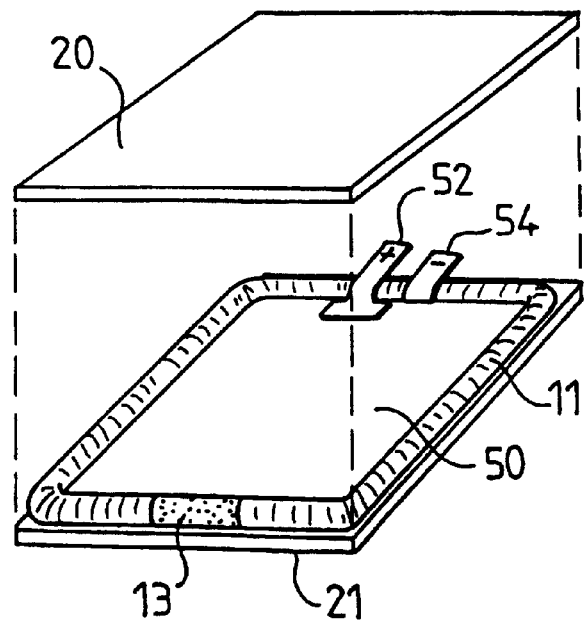
FIG. 9

SEALED CASING FOR CONTAINING AN ELECTRIC ACCUMULATOR

BACKGROUND OF THE INVENTION

The invention relates to a sealed casing provided for withstanding a certain pressure and intended to contain notably an electric accumulator, the casing being formed by at least one wall which has at least one closing area formed by a plastic band for connecting two edges of the wall.

The invention also relates to a flat accumulator formed from such a casing.

The invention finds highly significant applications, for example, for containing an accumulator of the lithium-ion or lead-acid type.

U.S. Pat. No. 5,326,652 describes such an accumulator and its casing. However, in that document, the problem of internal pressure of the accumulator is not mentioned. Indeed, the accumulators create pressures inside the envelopes formed by the casings containing them. This pressure may sometimes be so high that the envelope explodes, which is very dangerous, above all if the accumulator is of the type containing lithium. Therefore, valves may be provided which open when the variation of pressure exceeds a certain value that is incompatible with the solidity of this envelope.

SUMMARY OF THE INVENTION

The present invention proposes a casing of the type defined in the opening paragraph, the casing having an effective and low cost valve which can be incorporated notably in ultraflat casings.

Therefore, such a casing is characterized in that the closing area comprises an adhesive part and a shiftable part.

Thus, thanks to the invention, when the pressure is too large, the shiftable part which is not fixed to the edges of the wall may shift and leave an opening, so that the gas creating excessive pressure can escape.

According to a first characteristic feature of the invention, the length of the shiftable part is such that said shiftable part comes loose from said edges under the influence of an excessive pressure, thus creating an opening to the exterior. The elasticity of this shiftable part is sufficient so that when the pressure becomes normal again, the part reassumes its natural position. The operation of the inside element is re-established.

According to a second characteristic feature of the invention, at least one opening to the exterior of said plastic casing is provided at the level of said edges and the length of the shiftable part is such that under the influence of excessive pressure the opening is brought into contact with the exterior of said casing after the band has shifted.

These and other aspects of the invention will be apparent from and elucidated with reference to the embodiments described hereinafter.

BRIEF DESCRIPTION OF THE DRAWINGS

In the drawings:

FIGS. 8A–8B show a fourth variant of an embodiment of the invention, and FIG. 9 shows a flat accumulator formed on the basis of a casing, all this in accordance with the invention.

DESCRIPTION OF THE PREFERRED EMBODIMENTS

Figure 1:
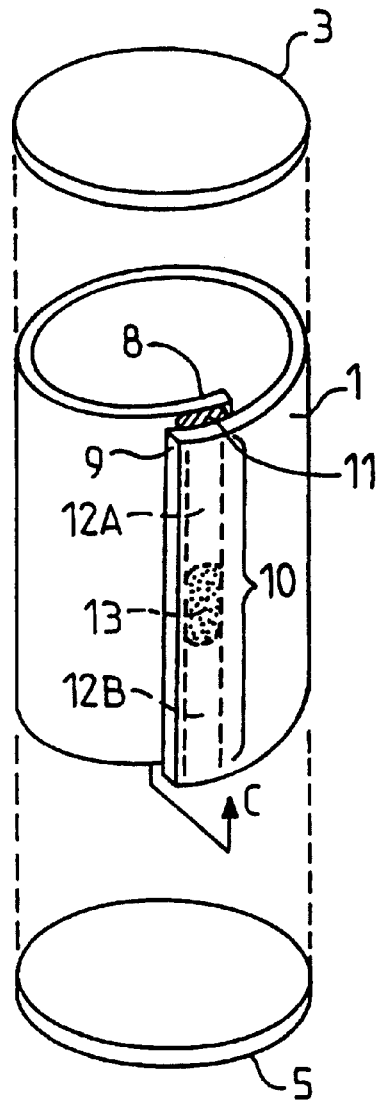
FIG. 1 shows in an exploded view a casing according to the invention.

In FIG. 1 is shown a casing of cylindrical form. It is formed by a side wall 1 formed by a curved plate, so that it has a cylindrical form. A cap 3 blocks the upper part of the cylinder, whereas a base 5 blocks the lower part. This plate 1 has two edges 8 and 9 which, as a result of the plate being curved, come in each other's proximity and overlap each other. For connecting these edges, a closing area 10 is provided in the part situated inside this overlap formed, in essence, by a silicon-based resin band 11. This area is to be such that when the cap 3 and the base 5 are put in place, the sealing of the casing thus formed is to be ensured. The casing is also to be able to withstand a certain internal pressure.

According to the invention, this closing area 10 has an adhesive part 12A and 12B and a shiftable part 13. In FIG. 1, the shiftable part 13 is situated between two adhesive parts 12A and 12B. This is shown in more detail in the cross-sectional view along C of FIG. 2. The adhesive part 12 is the part for which the plastic band 11 is solidly stuck on said edge 8 and 9, either by its natural adhesion, or by glue or also by ultrasound soldering. The shiftable part is not stuck to the edges at all, or stuck only slightly. This may be realized by a teflon coating. This shiftable part 13 remains tightened and, locked between the two edges 8 and 9 by the natural position of the elastic shiftable part 13.

Figure 2:
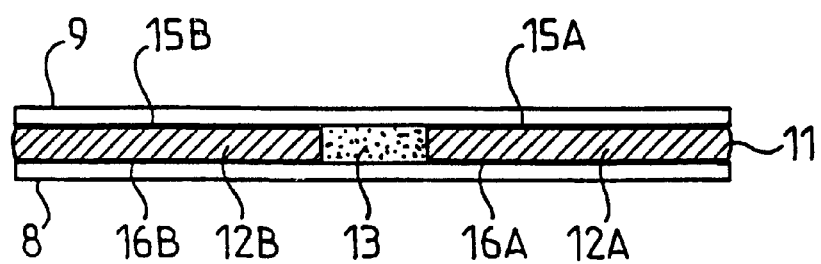
FIG. 2 shows an elevational view of the opening area.

In FIG. 2 are shown in bold lines the places where the adhesion between the band and the edges exists. With respect to area 12A, the bold lines 15A and 16A show the adhesion between the band 11 and the edges 8 and 9, respectively. As regards the adhesive area 12B, the bold lines 15B and 16B show the adhesion between the band 11 and the edges 8 and 9, respectively.

Figure 3:
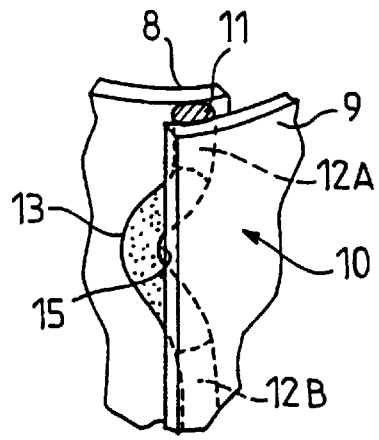
FIG. 3 shows the deformation of the band under the influence of pressure.

FIG. 3 shows the behavior of the closing area 10 when the internal pressure of the casing becomes excessive. Under the influence of this pressure, the shiftable part no longer ensures that the band 11 is held in place. It is shifted to the exterior, so that an opening 15 is formed connecting the inside of the casing with the outside. The purpose of this is to reduce the pressure on the inside. Depending on the material of the band, this shift may be final or not. In the first case, the casing is thus to be replaced, and in the second case the band resumes its initial position due to its elasticity and the casing ensures its function.

Figure 4:
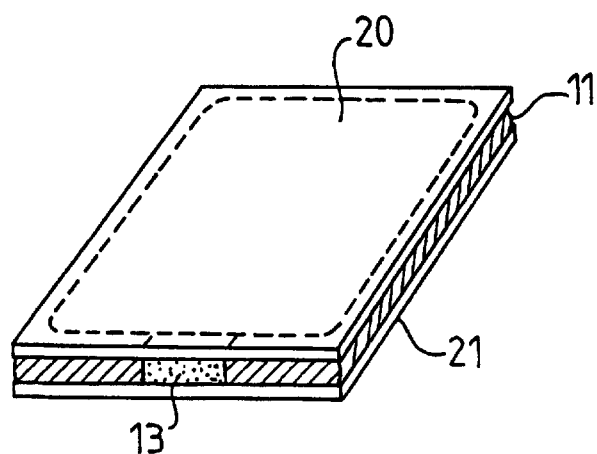
FIG. 4 shows a variant of a preferred embodiment of a casing according to the invention.
Figure 5:
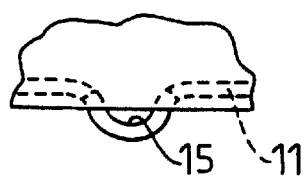
FIG. 5 shows the deformation of the band.

FIG. 4 shows the preferred embodiment of a casing according to the invention. It is formed by two plates 20 and 21 opposite each other and connected by the band 11 which is placed along the periphery of these two plates 20 and 21. The casing shown in FIG. 4 is similar in form to commonly used credit cards. As a matter of fact this casing is intended to contain lithium-ion or lead-acid battery elements and/or to be of a type described in U.S. Pat. No. 5,326,652 mentioned above. The casing of FIG. 4 thus comprises in accordance with the invention a shiftable part 13 which may be deformed under the influence of pressure and may let gas that causes this excessive overpressure escape by creating an opening 15 as shown in FIG. 5.

Figure 6A:
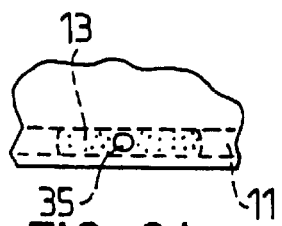
FIGS. 6A–6B show a second variant of an embodiment.
Figure 6B:
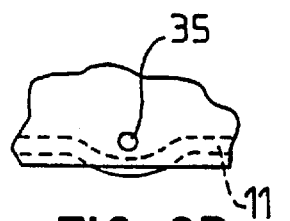

FIGS. 6A–6B show another embodiment of the invention. According to this other embodiment, at least one opening 35 is provided on the edge and one of the plates 20 or 21 or even in the two. Under normal pressure, this opening is masked by the band 11, or is located outside the envelope and does not let gas escape. This is shown in FIG. 6A. When the pressure becomes too high, under the influence of the pressure, the band is deformed at the level of area 13, and the opening 35 is unmasked letting the excessive gas escape. This is shown in FIG. 6B.

Figure 7A:
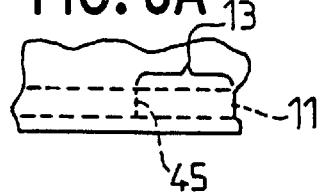
FIGS. 7A–7B show a third variant of an embodiment of the invention.
Figure 7B:
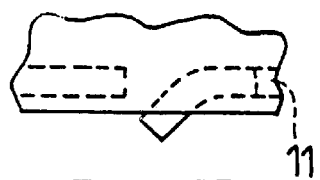

FIGS. 7A–7B show another embodiment. In this Figure, the band is intersected by a sealed slot 45 or a gap at the level of the shiftable part. The sealing is thus ensured as this is shown FIG. 7A. Under the influence of pressure, the part(s) situated on either side of the intersection of the shiftable part is or are pushed outward, thus letting the surplus gas escape, as is shown at FIG. 7B.

A last embodiment is shown in FIGS. 8A–8B. The material which forms the casing is a deformable material, so that it is deformed in the case of overpressure. Due to the internal overpressure, the deformable casing 20 is no longer maintained against the shiftable area 13 and deforms to form an opening 35' (see FIG. 8B) which and lets the gas escape.

FIG. 9 shows in an exploded view an accumulator according to the invention. It is formed by a flat casing of the type shown in FIG. 3 and following and by an accumulator element 50 of the type described in cited Patent. The electrodes of this element are accessible via the plates 52 and 54 which are covered by the band 11 so as to ensure the sealing.

What is claimed is:

1. A sealed casing for an accumulator comprising:

a wall which encloses said accumulator; and a sealing band which seals edges of said wall; said sealing band having a fixed part which is fixedly attached to said edges, and a non-fixed part which contacts said edges without being fixedly attached to said edges; said sealing band contacting said edges to isolate an interior of said casing from an exterior of said casing; said non-fixed part having an elasticity that provides sealing of said sealed casing in a quiescent condition.

2. The sealed casing of claim 1, wherein said wall is curved to form a cylinder.

3. The sealed casing of claim 1, wherein said sealing band is formed between overlapping parts of said edges.

4. The sealed casing of claim 1, wherein said non-fixed part deforms toward said exterior to expose said interior to said exterior during overpressure which occurs when an internal pressure is greater than an external pressure.

5. The sealed casing of claim 1, wherein said non-fixed part covers a hole in said wall in said quiescent position and deforms to uncover said hole and expose said interior to said exterior during overpressure which occurs when an internal pressure is greater than an external pressure.

6. The sealed casing of claim 1, wherein said wall deforms to create an opening at said non-fixed part to expose said interior to said exterior during overpressure which occurs when an internal pressure is greater than an external pressure.

7. The sealed casing of claim 1, wherein one side of said non-fixed part is not fixedly attached to said fixed part so that said one side moves toward said exterior to expose said interior to said exterior during overpressure which occurs when an internal pressure is greater than an external pressure.

8. A casing comprising:

a first plate;

a second plate; and a sealing band located between said first plate and said second plate at edges of said first plate and said second plate wall, said sealing band contacting said edges to isolate an interior of said casing from an exterior of said casing, wherein said sealing band has a fixed part which is fixedly attached to said edges, and a non-fixed part which is not fixedly attached to said edges; said non-fixed part having an elasticity that provides sealing of said sealed casing in a quiescent condition.

9. The casing of claim 8, wherein said first plate and said second plate are flat.

10. The casing of claim 8, wherein said non-fixed part deforms toward said exterior to expose said interior to said exterior during overpressure which occurs when an internal pressure is greater than an external pressure.

11. The casing of claim 8, wherein said non-fixed part covers a hole in said wall in a quiescent position and deforms to uncover said hole and expose said interior to said exterior during overpressure which occurs when an internal pressure is greater than an external pressure.

12. The casing of claim 8, wherein said first plate deforms to create an opening at said non-fixed part to expose said interior to said exterior during overpressure which occurs when an internal pressure is greater than an external pressure.

13. The casing of claim 8, wherein one side of said non-fixed part is not fixedly attached to said fixed part so that said one side moves toward said exterior to expose said interior to said exterior during overpressure which occurs when an internal pressure is greater than an external pressure.

14. An accumulator comprising:

a casing; and a battery element located in said casing; wherein said casing includes:

a wall which encloses said battery element; and a sealing band which seals edges of said wall; said sealing band having a fixed part which is fixedly attached to said edges, and a non-fixed part which is not fixedly attached to said edges; said sealing band contacting said edges to isolate an interior of said casing from an exterior of said casing; said non-fixed part having an elasticity that provides sealing of said sealed casing in a quiescent condition.

15. The accumulator of claim 14, wherein said wall is curved to form a cylinder.

16. The accumulator of claim 14, wherein said wall is flat and includes a first plate and a second plate which are sealed at said edges by said sealing band.

17. The accumulator of claim 14, wherein said sealing band is formed between overlapping parts of said edges.

18. The accumulator of claim 14, wherein said non-fixed part deforms toward said exterior to expose said interior to said exterior during overpressure which occurs when an internal pressure is greater than an external pressure.

19. The accumulator of claim 14, wherein said non-fixed part covers a hole in said wall in a quiescent position and deforms to uncover said hole and expose said interior to said exterior during overpressure which occurs when an internal pressure is greater than an external pressure.

20. The accumulator of claim 14, wherein said wall deforms to create an opening at said non-fixed part to expose said interior to said exterior during overpressure which occurs when an internal pressure is greater than an external pressure.

21. The accumulator of claim 14, wherein one side of said non-fixed part is not fixedly attached to said fixed part so that said one side moves toward said exterior to expose said interior to said exterior during overpressure which occurs when an internal pressure is greater than an external pressure.

* * * * *